United States Patent [19]

Kruger

[11] Patent Number: 4,838,944
[45] Date of Patent: Jun. 13, 1989

[54] DEGRADATION OF GRANULAR STARCH

[75] Inventor: Leo H. Kruger, Kendall Park, N.J.

[73] Assignee: National Starch and Chemical Corporation, Bridgewater, N.J.

[21] Appl. No.: 63,193

[22] Filed: Jun. 17, 1987

[51] Int. Cl.$^4$ .................. C08B 31/00; C08B 30/12
[52] U.S. Cl. ............................. 127/71; 127/70; 127/33; 127/32; 426/661; 536/102
[58] Field of Search ............ 127/71, 70, 33, 32; 426/661; 536/102

[56] References Cited

U.S. PATENT DOCUMENTS

| | | | |
|---|---|---|---|
| 2,307,684 | 1/1943 | Kauffmann et al. | 127/33 |
| 2,916,405 | 12/1959 | Evans et al. | 127/33 |
| 3,655,644 | 4/1972 | Durand | 260/233.3 R |
| 3,975,206 | 8/1976 | Lotzgesel et al. | 127/71 |

FOREIGN PATENT DOCUMENTS

| | | | |
|---|---|---|---|
| 22370 | of 1903 | United Kingdom | 127/33 |
| 25121 | of 1910 | United Kingdom | 127/33 |

OTHER PUBLICATIONS

T. Omori, "Über Schwermetallkatalyse Von Biologischem Interesse" J. of Biochemistry, vol. XIV: 2, pp. 331–337 (in German) (1931).
R. Whistler and R. Schweiger, Oxidation of Amylopectin with $H_2O_2$ at Different Hydrogen Ion Concentrations, J.A.C.S. vol. 81, pp. 3136–3139 (1959).

Primary Examiner—H. M. S. Sneed
Assistant Examiner—Chung K. Pak
Attorney, Agent, or Firm—Edwin M. Szala; Ellen T. Dec

[57] ABSTRACT

A process for the degradation of granular starch employing hydrogen peroxide and a catalytic amount of manganese ions in an alkaline slurry reaction is disclosed. The manganese ions catalyze the degradative reaction so that the desired amount of degradation of the granular starch can be brought about in a shorter reaction period as opposed to a reaction run without manganese ions.

14 Claims, No Drawings

DEGRADATION OF GRANULAR STARCH

This invention relates to a process for the degradation of granular starch. More particularly, it relates to a process employing hydrogen peroxide together with a manganese salt catalyst in a slurry reaction where the degree of degradation of the starch can be closely controlled.

BACKGROUND OF THE INVENTION

Degraded (converted) starches are desirably used or required in many industrial applications including, for example, in the manufacture of gypsum-board for dry wall construction, in paper and paper board manufacture, in textile warp sizing applications, as well as in the production of starch gum candy. It is known that undegraded native cereal and potato starches show a natural occurring variation in viscosity after gelatinization in water at concentrations of about 4–12% by weight. In some industrial operations, process control conditions require that a starch exhibits a reproducible particular defined viscosity after gelatinization. Mild conversion of the starch can be used to provide such required consistency.

The degradation of starches by conversion involves mainly a scission of the starch molecules to lower molecular weight fragments. When this is carried out on a granular starch, the granular structure is weakened and the granules tend to disintegrate more readily and more rapidly during the gelatinization process leading to a lower hot paste viscosity.

In commercial practice, starch is ordinarily converted by acid or enzyme conversion techniques. Acid conversion is preferred due to the ease in handling and recovery afforded by a granular starch as opposed to starch in dispersed form as necessitated by enzyme conversion.

In preparation of the converted starches by acid treatment, the granular starch base is hydrolyzed to the required viscosity in the presence of an acid, such as sulfuric or hydrochloric acid, at a temperature below the gelatinization point of the starch. The starch is slurried in water, and the acid (usually in concentrated form) is then added. Typically, the reaction takes place over an 8–16 hour period, after which the acid is neutralized with alkali (e.g., to a pH of 5.5), and the starch recovered by filtration.

In preparation of the converted starches by enzyme treatment, the granular starch base is slurried in water, and the pH is adjusted to about 5.6–5.7 with alkali or acid. A small amount of alpha amylase enzyme (e.g., about 0.02% on the starch) is added to the slurry, which is then heated above the gelatinization point of the starch. When the desired conversion is reached, the pH is adjusted with acid (e.g., to about 2.0) to deactivate the enzyme and the dispersion is held at the pH for a period of at least 10 minutes. Thereafter the pH may be readjusted. The resulting converted starch dispersion is usually jet-cooked to ensure complete solubilization of the starch and deactivation of the residual enzyme.

The use of hydrogen peroxide on starch as a converting (thinning) agent alone or together with metal catalysts has been known for some time. U.S. Pat. No. 3,975,206 assigned to A. E. Staley Manufacturing Company is directed to an improved process for oxidative thinning of starch employing hydrogen peroxide in combination with heavy metal salt catalysts such as iron, cobalt, copper or chromium. It is stated that substantially more effective thinning was obtained when no pH adjustments were made (pH about 3.2) as compared to a similar reaction maintained at pH 9.7 with sodium hydroxide. The 206 patent itself lists a number of references directed to degrading (thinning) starch with hydrogen peroxide under a variety of conditions.

U.S. Pat. No. 2,307,684 assigned to Buffalo Electro-Chemical Company teaches a method of liquefying starch by treating natural or raw starch with a peroxide in the presence of a catalyst which can be a metal such as copper or manganese or their salts. It is suggested that an initial pH of above 7, preferably about 9 to 10 be produced in the mixture, but the liquefied starch finally obtained after the reaction possesses a pH of between about pH 6 and pH 8. The liquefying treatment employs temperatures above the gel point of the starch.

U.S. Pat. No. 3,655,644 assigned to Grain Processing Corporation discloses a method of thinning derivatized starch using hydrogen peroxide employing a temperature in the range of 80° to 130° F. (27° to 54° C.), a pH in the range of 7.0 to 12.0, and a copper ion catalyst in an amount from about 5 to 100 parts per million by weight of starch.

T. Omori, in an article in the Journal of Biochemistry, Volume XIV:2, pages 331–337 (in German), reports on peroxide treatment of gelatinized starch employing various heavy metals, including manganese chloride. Typical reactions were run at pH 3.6 on starch employed in very low concentrations, about 0.05%.

It is seen that there is still a need for an efficient, commercially useful process for controllably preparing a degraded granular starch which process does not employ acids or enzymes.

SUMMARY OF THE INVENTION

In accordance with the process of the present invention, a granular starch slurry is provided, ordinarily at 20–50% solids, and the pH is raised to about 11.0 to 12.5, preferably 11.5 to 12.0, with sodium hydroxide. In order to achieve improved reaction rates when using slurry temperatures below about room temperature, (e.g., 0°–20° C.), it is preferable that the pH level be maintained at the upper portion of the designated useful pH range (pH 11.8–12.5). Sufficient potassium permanganate or other source of manganese ions is added with stirring to the slurry to provide a concentration of about 1 to 80 ppm (parts per million) of manganese ions based on the amount of starch solids. If desired, the manganese ions can be added to the slurry prior to the pH adjustment. The manganese ions catalyze the hydrogen peroxide/starch reaction so that a desired amount of degradation (thinning) of the granular starch can be effected in a substantially shorter reaction period as opposed to a reaction without manganese ions. Temperatures ranging from about 0°–55° C. can be used in reacting the starch but a range of about 22°–45° C. is most practical and preferred in the process with the higher temperatures requiring less time for completion of the reaction. Since the invention is directed to the preparation of a granular degraded starch, it is important that the selected temperature and pH do not cause gelatinization of the starch. With most starches, the temperature should not be allowed to go much above 50° C. because of the possible initiation of gelatinization. Hydrogen peroxide is introduced into the slurry with the full amount added at once or preferably divided into several portions (5 to 6 or more with larger amounts of peroxide) and added at about one-hour intervals. The amount of hydrogen peroxide employed is from 0.01 to 2.0%, anhydrous, preferably 0.05 to 0.5%, based on starch solids. The reagent is ordinarily introduced by the addition of sufficient 30-35% aqueous hydrogen peroxide as is commonly supplied in commerce. The practitioner can easily determine the details of the preferred manner of addition of any of the reaction components.

The agitated slurry is usually held for a total of 4-18 hours at the designated temperature after the first addition of the hydrogen peroxide. In some cases reaction periods of 2 hours or less may be adequate. In cases of very high degradations and/or low temperatures, the reaction period may be extended to as much as 36 hours. Samples of the slurry can be taken at periodic intervals and the viscosity of the starch determined to monitor the progress of the starch degradation. When the desired level of starch degradation is reached, a reducing agent for example, sodium bisulfite or sodium metabisulfite, can be added to remove any excess hydrogen peroxide.

In a variation of the described procedure, a portion, about one-third or one-quarter of the hydrogen peroxide estimated or calculated to be needed to reach the desired degradation, can be added to the slurry, allowing time for its reaction with the starch. After the addition of 2 or 3 such portions the degree of starch degradation can be determined and additional hydrogen peroxide is added as needed or the reaction can be terminated. In this variation the peroxide increments are reacted as they are added and better control of the degradation end-point can be achieved. A potassium iodide spot test can be used to confirm the presence or absence of hydrogen peroxide in the test slurry.

When the desired degradation is reached, the slurry is adjusted to a pH level of 5.0-6.0 using dilute hydrochloric acid or other common acid and filtered. The filter cake is optionally washed with water, refiltered and dried in any conventional manner.

It is noted that based on texture and gelling tendencies of the cooked starch dispersion, the degraded starch of the present invention closely resembles an acid hydrolyzed starch rather than an oxidized starch prepared commercially using hypochlorite. The present method is not intended to provide full solubilization or liquefaction of the starch.

DESCRIPTION OF THE PREFERRED EMBODIMENTS

The applicable starches which may be utilized in the present invention may be derived from any plant source including corn, potato, sweet potato, wheat, rice, sago, tapioca, waxy maize sorghum, high amylose corn or the like. Also included are derivatized starches, such as ethers or esters, provided they are able to withstand the temperature and required high pH without significant detrimental hydrolysis. The starches useful herein are in their granular form and the described treatment does not destroy their granular properties to any significant degree.

In addition to the use of potassium permanganate, which is preferred, other manganese salts may be used as well provided they are sufficiently water-soluble to supply the necessary catalytic concentration of manganese ions. Thus also useful, for example, are: manganous chloride, manganic acetate, manganous acetate, manganous nitrate and manganous sulfate. The amount of manganese ions needed to promote the degradation is from about 1-80 ppm, preferably 5-50 ppm, based on starch solids. Amounts less than 1 ppm do not appear to hasten the reaction significantly while amounts of 55 to 60 ppm or more tend to yield lower reaction efficiencies as compared to the efficiencies obtained using 5-50 ppm.

The degree of starch degradation is correlated to and measured as the viscosity exhibited by a starch paste at a given solids concentration: as conversion of the starch (degradation) increases, viscosity is decreased.

VISCOSITY MEASUREMENT

For purposes of this invention the viscosity of the degraded starch is determined in terms of water fluidity and is measured by using a Thomas Rotational Shear-Type Viscometer (manufactured by Arthur H. Thomas, Co., Philadelphia, Pa. 19106), standardized at 30° C. with a standard oil having a viscosity of 24.73 cps. which oil requires 23.12±0.05 sec. for 100 revolutions. As conversion of the starch increases, the viscosity of the starch decreases. Accurate and reproducible measurements of the water fluidity are obtained by determining the time which elapses for 100 revolutions at different solids levels depending on the degree of conversion of the starch. The general procedure is as follows: The required amount of starch (e.g. 6.16 g. dry basis) is slurried in 100 ml. of distilled water in a covered copper cup, and the slurry heated in a boiling water bath for 30 min. with occasional stirring. Then, the starch solution is brought to the final weight (e.g., 107 g.) with distilled water. The time required for 100 revolutions of the resultant solution at 81°-83° C. is recorded and converted to a water fluidity number as defined in the table below:

| Amount of Starch Used (anhydrous, g.): | | | | |
|---|---|---|---|---|
| $6.16^a$ | $8.80^b$ | $11.44^c$ | $13.20^d$ | |
| Time required for 100 revolutions (sec.) | | | | Water Fluidity |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |

$^a$Final weight of starch solution = 107 g.
$^b$Final weight of starch solution = 110 g.
$^c$Final weight of starch solution = 113 g.
$^d$Final weight of starch solution = 115 g.

The invention can be further illustrated by the following examples or prepared embodiments thereof, although it will be understood that these examples are included merely for purposes of illustration and are not intended to limit the scope of the

EXAMPLE 1

This example illustrates a representative embodiment of the process using hydrogen peroxide and potassium permanganate. A starch slurry was provided by suspending 200 g., dry basis, of granular tapioca starch in 300 ml of water. The mixture was stirred and the temperature raised to about 35° C. by means of a waterbath. To this mixture was added 10 ml of a 0.1% aqueous solution of potassium permanganate (0.005% or 50 ppm based on starch which corresponds to 17.5 ppm of manganese ions based on starch). The pH of the mixture was raised to 11.5 by adding 23.0 ml of 3% aqueous sodium hydroxide over a 5 minute period. The slurry was well mixed using a mechanical agitator with a stainless steel paddle. After the pH adjustment, 0.5 g. of approximately 30% aqueous hydrogen peroxide was added in one addition but over a period of about 10 sec. (0.075 % of 100% hydrogen peroxide based on starch). The addition of the hydrogen peroxide caused the pH of the slurry to drop to 11.4 and an additional 2.2 ml of 3% aqueous sodium hydroxide was added to readjust the slurry to pH 11.5. In three hours the reaction was nearly complete (the hydrogen peroxide was nearly absent) as was indicated by a potassium iodide colorometric spot test run on a sample of the slurry. The reaction was allowed to continue for another hour after which the pH of the slurry was lowered to 5.5 with dilute (10%) hydrochloric acid. The starch was recovered by filtration, washed and refiltered, and air dried. Evaluation: A sample of the air dried starch was slurried in distilled water so as to contain 11.44 g. starch, dry basis, in 113 g. of slurry. Following the viscosity measurement procedure described above, the time required for 100 revolutions of the spindle in the test solution at about 80° C. was 23.6 seconds which is converted to a water fluidity of 53.

EXAMPLE 2 (Comparison)

This example illustrates a similar degradation process using a six-fold increase of hydrogen peroxide but employing no manganese ion catalyst.

The reaction here was run as described in Example 1 using 200 g., dry basis, of granular tapioca starch with the following differences:

(a) 0.5% of hydrogen peroxide, anhydrous, based on starch solids, was used (added over a three-hour period), (b) no manganese salt was added, (c) total reaction time was 99 hours.

The viscosity of the treated starch (cooked) was high being much closer to the viscosity of the untreated starch than to the viscosity of the starch of Example 1. Following the viscosity measurement procedure described above, the starch of Example 2 exhibited a water fluidity of 8.

It is seen that employing a substantially larger concentration of hydrogen peroxide and extended reaction period produces only a slight degradation when the catalytic manganese ions are omitted.

EXAMPLE 3

This example illustrates the process employing a waxy corn starch with a relatively high amount of hydrogen peroxide. A thin product was obtained.

The general procedure of Example 1 was repeated employing 200 g., dry basis, of waxy corn starch. The reaction temperature was 25° C. About 0.7% of hydrogen peroxide (anhydrous) based on starch was employed added over a period of 10 hours. The reaction was allowed to run a total of 18 hours.

Viscosity measurement run on the degraded starch showed a water fluidity of 75.

EXAMPLE 4

This example utilizes a low temperature gelatinizing waxy starch sold under the trademark VO by National Starch and Chemical Corporation.

The general procedure of Example 1 was repeated employing 200 g., dry basis, of VO starch and 50 ppm of potassium permanganate. The reaction temperature was 35° C. About 2.0% of hydrogen peroxide based on the starch was added to the starch slurry at about 0.1% per hour. The reaction was allowed to run a total of 36 hours.

Viscosity measurement run on the degraded starch showed a water fluidity of 85.

EXAMPLE 5

This example shows a series of experimental trials run at various pH levels. Regular corn starch was used following the general procedure of Example 1 with 50 ppm of potassium permanganate based on the starch. The full amount of hydrogen peroxide was added at one time. Process conditions and the viscosity of the degraded starch are summarized in the table below.

TABLE I

| Trial No. | Temp. | $H_2O_2$ | Rx Time (hr.) | Slurry pH | Visc. WF |
|---|---|---|---|---|---|
| 1. | 25° C. | 0.10% | 2.5 | 11.5–11.8 | 30 |
| 2. | 25° C. | 0.15% | 8 | 11.0 | 12 |
| 3. | 25° C. | 0.15% | 6 | 10.0 | 0–2* |
| 4. | 25° C. | 0.15% | 25 | 9.0 | 0–2* |
| 4a. | 25° C. | 0.06% | 4 | 12.1 | 28 |
| 4b. | 25° C. | 0.06% | 4 | 12.3 | 31 |
| 4c. | 25° C. | 0.06% | 4 | 12.5 | 31 |

*not run - estimated

The processes run at pH 10.0 and 9.0 produced no significant degradation of the starch. Trial No. 1 which was run within the preferred pH range showed the most degradation in the shortest time.

EXAMPLE 6

In this example a series of trials were run to show the utility of the process at various temperatures. Regular corn starch was used following the general procedure of Example 1 with 50 ppm of potassium permanganate based on the weight of the starch. Process conditions and the viscosity of the degraded starch are summarized in the table below.

TABLE II

| Trial No. | Temp. | $H_2O_2$ | Rx Time (hr.) | Slurry pH | Visc. WF |
|---|---|---|---|---|---|
| 5. | 25° C. | 0.06% | 18 | 11.5 | 38 |
| 6. | 0° C. | 0.15% | 18 | 11.5 | 35 |
| 7. | 5° C. | 0.06% | 18 | 11.7 | 26 |
| 8. | 50° C. | 0.06% | 18 | 11.3 | 22 |

EXAMPLE 7

The example illustrates the utility of manganous chloride in the process herein.

The general procedure of Example 1 was repeated employing 200 g., dry basis, of waxy corn starch and a temperature of about 25° C. Manganous chloride was substituted for potassium permanganate in a concentration providing an equivalent amount of manganese ions. Hydrogen peroxide was used in a concentration of 0.06% based on the starch.

Viscosity measurement run on the degraded starch showed a water fluidity of 38.

EXAMPLE 8

In this example, a series of experimental trials were run employing various concentrations of manganese ions.

The general procedure of Example 1 was repeated employing 200 g., dry basis, of granular tapioca starch slurried in 300 ml of water and the process was run at room temperature. The pH of the slurry was raised to 11.5 with caustic and in trial nos. 9-16 0.06% of 100% hydrogen peroxide based on starch was added. The pH of the slurry readjusted to 11.5 and the reaction was permitted to run overnight (about 20 hours). No manganese ions were added to the control and the amounts of manganese ions added to the other trials were as noted in Table III. Where added, the manganese ions were supplied by the addition of potassium permanganate to the slurry prior to the addition of hydrogen peroxide.

In trial nos. 17-21, the pH was maintained as in the earlier trials but a higher temperature (40° C.), higher peroxide concentration (0.12%), and a shorter reaction period (6 hours) were used.

TABLE III

| Trial No. | Temp. | $H_2O_2$ | Mn ion (ppm) | Rx Time (hr.) | Visc. WF |
|---|---|---|---|---|---|
| 9 (control) | 25° C. | 0.06% | 0 | 20 | 6 |
| 10 | 25° C. | 0.06% | 0.007 | 20 | 11 |
| 11 | 25° C. | 0.06% | 0.07 | 20 | 16 |
| 12 | 25° C. | 0.06% | 0.70 | 20 | 26 |
| 13 | 25° C. | 0.06% | 7.00 | 20 | 35 |
| 14 | 25° C. | 0.06% | 17.50 | 20 | 36 |
| 15 | 25° C. | 0.06% | 35.0 | 20 | 35 |
| 16 | 25° C. | 0.06% | 70.0 | 20 | 12 |
| 17 | 40° C. | 0.12% | 15.0 | 6 | 46 |
| 18 | 40° C. | 0.12% | 30.0 | 6 | 45 |
| 19 | 40° C. | 0.12% | 45.0 | 6 | 45 |
| 20 | 40° C. | 0.12% | 55.0 | 6 | 38 |
| 21 | 40° C. | 0.12% | 60.0 | 6 | 26 |

While the starch degradation process of the present invention has been described employing hydrogen peroxide together with a manganese salt catalyst, it will be understood that other compounds which yield hydrogen peroxide on contact with water can be substituted for the required hydrogen peroxide. Examples of such useful compounds include alkali metal and alkaline earth metal peroxide salts such as sodium and potassium peroxide.

Now that the preferred embodiments have been described in detail, various modifications and improvements thereon will become readily apparent to those skilled in the art. Accordingly, the spirit and scope of the present invention are to be limited only by the appended claims, and not by the foregoing specification.

I claim:

1. A process for degrading granular starch with hydrogen peroxide at a temperature of from 0°–55° C. and below the gelatinization temperature of said starch, the steps comprising providing an aqueous slurry of said granular starch at a pH level of 11.0 to 12.5, adding an effective catalytic amount of manganese ions to said aqueous slurry, adding said hydrogen peroxide to said aqueous slurry in an amount ranging from 0.01 to 2.0%, anhydrous, based on starch solids, to initiate a degradation reaction and allowing the reaction to continue over a period of from about 2 to 36 hours.

2. The process of claim 1 including the steps of adjusting the slurry to pH 5.0–6.0 when the degradation is terminated, recovering the degraded granular starch by filtration, and thereafter driving.

3. The process of claim 1 wherein the effective catalytic amount of manganese ions added to the slurry is from about 1 to 80 ppm, based on starch solids.

4. The process of claim 1 wherein the degradation reaction is run at a temperature of about 22°–45° C.

5. The process of claim 3 wherein the degradation reaction is run at a temperature of 22°–45° C. over a period of from about 4 to 18 hours.

6. The process of claim 4 wherein the hydrogen peroxide is added to the slurry in one portion.

7. The process of claim 4 wherein the hydrogen peroxide is added to the slurry in two or more portions at separate intervals.

8. The process of claim 1 wherein the pH of the slurry is adjusted or readjusted to 11.5 to 12.0 after the addition of the hydrogen peroxide.

9. The process of claim 1 wherein the effective catalytic amount of manganese ions added to the slurry is from about 5 to 50 ppm, based on starch solids.

10. The process of claim 1 wherein the manganese ions are supplied by the addition of potassium permanganate.

11. In a process for degrading granular starch with hydrogen peroxide in an aqueous slurry of said granular starch at a temperature of from about 0° to 55° C. and below the gelatinization temperature of said starch, at a pH of about 11.0 to 12.5, the improvement comprising the step of adding an effective atalytic amount of potassium permanganate to provide manganese ions to said aqueous slurry.

12. The process of claim 11 wherein the hydrogen peroxide is added to the slurry in one portion.

13. The process of claim 11 wherein the hydrogen peroxide is added to the slurry in two or more portions at separate intervals.

14. The process of claim 11 wherein the effective catalytic amount of manganese ions added to the slurry is from about 1 to 80 ppm, based on starch solids and the slurry is at a temperature of from 22° to 45° C.

* * * * *